(12) United States Patent
Ko et al.

(10) Patent No.: US 7,358,316 B2
(45) Date of Patent: Apr. 15, 2008

(54) PROCESS FOR PREPARING ORGANIC SILICATE POLYMER

(75) Inventors: Min-Jin Ko, Seoul (KR); Myung-Sun Moon, Daejeon (KR); Dong-Seok Shin, Seoul (KR); Jung-Won Kang, Seoul (KR); Hye-Yeong Nam, Cheongju (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 10/380,812

(22) PCT Filed: Sep. 18, 2001

(86) PCT No.: PCT/KR01/01563

§ 371 (c)(1),
(2), (4) Date: Mar. 18, 2003

(87) PCT Pub. No.: WO02/22710

PCT Pub. Date: Mar. 21, 2002

(65) Prior Publication Data

US 2003/0191269 A1 Oct. 9, 2003

(30) Foreign Application Priority Data

Sep. 18, 2000 (KR) .............................. 2000-54591

(51) Int. Cl.
*C08G 77/06* (2006.01)

(52) U.S. Cl. ...................... 528/12; 528/39; 106/287.1; 428/447

(58) Field of Classification Search .................. 528/12, 528/39; 106/287.1; 428/447
See application file for complete search history.

(56) References Cited

U.S. PATENT DOCUMENTS

| 4,159,206 | A | * | 6/1979 | Armbruster et al. ... 106/287.12 |
| 4,539,232 | A | | 9/1985 | Burzynski et al. .......... 427/387 |
| 5,086,145 | A | | 2/1992 | Morimoto et al. ............ 528/14 |
| 5,181,141 | A | * | 1/1993 | Sato et al. ................... 359/580 |
| 5,654,090 | A | * | 8/1997 | Kayanoki .................... 428/329 |
| 5,733,644 | A | * | 3/1998 | Tanaka et al. .............. 428/215 |
| 6,168,773 | B1 | * | 1/2001 | Sharp ......................... 423/338 |
| 6,376,634 | B1 | * | 4/2002 | Nishikawa et al. ........... 528/25 |

FOREIGN PATENT DOCUMENTS

| RU | 2 044 014 C1 | 9/1995 |
| WO | WO 97/22652 | 6/1997 |

OTHER PUBLICATIONS

Chung, et al.; "Comparitive Study of Hydrido Organo Siloxane Polymer and Hydrogen Silsesquioxane"; Jpn. J. Appl. Phys.; vol. 39, part1, No. 10; pp. 5809-5815; Oct. 2000.
Wang, et al.; "Thermal Cure Study of a Low-k Methyl Silsesquioxane for Intermetal Dielectric Application by FT-IR Spectroscopy"; Applied Spectroscopy; vol. 54, No.2; pp. 209-213; 2000.
Maex, et al.; "Low dielectric constant materials for microelectronics"; Journal of Applied Physics; vol. 93, No. 11; pp. 8793-8841; Jun. 1, 2003.
International Search Report for International application No. PCT/KR01/01563; Jan. 17, 2002.
PCT International Preliminary Examination Report for PCT/KR01/01563; Dec. 17, 2002.

* cited by examiner

*Primary Examiner*—Kuo-Liang Peng
(74) *Attorney, Agent, or Firm*—Cantor Colburn LLP

(57) ABSTRACT

The present invention relates to a low dielectric material essential for a next generation electric device such as a semiconductor device, with a high density and high performance. In detail, the present invention provides: a process for preparing an organic silicate polymer comprising a polymerization step in the absence of homogenizing organic solvents, of mixing and reacting organic silane compounds with water in the presence of a catalyst to hydrolyze and condense the silane compounds, that is thermally stable and has good mechanical and crack resistance properties; and a coating composition for forming a low dielectric insulating film; and a process for preparing a low dielectric insulating film using the organic silicate polymer prepared according to the process, and an electric device comprising the low dielectric insulating film prepared according to the process.

6 Claims, 2 Drawing Sheets

PROCESS FOR PREPARING ORGANIC SILICATE POLYMER

BACKGROUND OF THE INVENTION (a) Field of the Invention

The present invention relates to a low dielectric material essential for a next generation electric device such as a semiconductor device, with a high density and high performance. More specifically, the present invention relates to: a process for preparing an organic silicate polymer that is thermally stable and has good mechanical and crack resistance properties, and a coating composition for forming a low dielectric insulating film; and a process for preparing a low dielectric insulating film using the organic silicate polymer prepared according to the process, and an electric device comprising the low dielectric insulating film prepared according to the process.

(b) Description of the Related Art

The semiconductor industry is moving toward increasing device complexity, requiring shrinking geometric dimensions and higher component integration with greater dimensional densities in integrated circuit devices, e.g. memory and logic chips. This has led to an increase in the number of wiring levels and a reduction in wiring pitch to increase the wiring density. Current leading-edge logic processors have 7-8 levels of high density interconnect, and interconnect line widths are scheduled to decrease to 0.1 µm around the year 2005.

As device dimensions shrink to less than 0.25 µm, propagation delay, crosstalk noise, and power dissipation due to resistance-capacitance (RC) coupling become significant. The smaller line dimension increases the resistivity of metal wires, and the narrow intermetal spacing increases the capacitance between the metal wires. Thus, although the switching speed of devices will increase as the feature size decreases, the interconnect delay becomes the major fraction of the total delay and limits the overall chip performance. Accordingly, in order to prepare a chip having high speed, a conductor having a low resistance and a dielectric material having a low dielectric constant should be used. In addition, the use of low dielectric material can remarkably decrease the power dissipation and crosstalk noise.

Recently, several semiconductor device manufacturers have put test products on the market that show improvements in their performance of 20% or more, using copper wiring with high electric conductivity instead of using the conventional aluminum wiring. A shift to use of new materials that exhibit low dielectric constant performance, for use in interconnects, has recently been undertaken. If the dielectric films between interconnect layers in integrated circuits can make use of these materials, the effect on operating speed will be the same as that which resulted with the switch from aluminum to copper technology. For instance, if the dielectric constant of the dielectric material is changed from 4.0 to about 2.5, IC operating speed will be improved by about 20%.

The interlayer dielectric material used in semiconductor integrated circuit devices is predominantly $SiO_2$, which is generally formed using chemical vapor deposition (CVD) to withstand various processing operations associated with the conditions under which a dielectric is formed. The dielectric constant of silicon thermal oxidation films, which have the lowest dielectric constant, is on the order of 4.0. Attempts have been made to reduce the dielectric constant by introducing fluorine atoms into an inorganic film deposited by CVD. However, the introduction of fluorine atoms in large amounts decreases the chemical and thermal stability, so the dielectric constant achieved in actual practice is on the order of 3.5. Fluorinated oxides can provide an immediate near-term solution and a shift to new types of insulating materials with sub-3 dielectric constant may be required.

One class of candidates is organic polymers, some of which have a dielectric constant of less than 3.0. Incorporating fluorine into such organic polymers is known to further lower the dielectric constant. Most organic polymers do not, however, posses the physico-chemical properties required for on-chip semiconductor insulation, particularly thermal stability and mechanical properties (sufficient to withstand back-end line-fabrication temperatures within the range of 400~450° C.). Few organic polymers are stable at temperature greater than 450° C. They also have a low glass transition temperature and thus elasticity thereof remarkably decreases at high temperatures, and they have a very high linear expansion coefficient. Since the temperature rises to 450° C. during semiconductor IC integration and packaging processes, the resulting low thermal stability and elasticity and high linear expansion coefficient can deteriorate the reliability of the devices.

Recently, in order to solve thermal stability problems of organic polymers, the development of organic silicate polymers using a sol-gel process has emerged. In particular, organic SOG (Spin On Glass), having a dielectric constant in the range of about 2.7~3.3, has been proposed for use as interlayer dielectrics in which the side chain of an organic component (an alkyl group such as methyl) is bonded to the backbond chain of a siloxane bond.

There have so far been known various methods for producing organic silicate polymers such as polyalkylsilsesquioxane for use as a protective film, an interlayer insulating film, etc. for electronic parts or semiconductor elements. General methods for the synthesis of organic silicate polymers are to hydrolyze and condense a silane precursor in a single organic solvent or mixture of organic solvents. The structure of organic silicate polymers-has been reported as a random structure, ladder structure, cage structure, and partial cage structure. In particular, the polysilsesquioxane which contains 1.5 oxygen atoms per silicon atom has a high level of cage or ladder structure and poor mechanical properties. For instance polymethylsilsesquioxane typically has poor mechanical properties. It experiences crack formation during processing unless the film is very thin (often <1 µm).

SUMMARY OF THE INVENTION

Accordingly, the present invention is made to solve these problems of the prior art, and it is an object of the present invention to provide a process for preparing an organic silicate polymer that can form an insulating thin film having excellent crack resistance and mechanical strength.

It is another object of the present invention to provide a coating composition for forming a low dielectric insulating film and a process for preparing a low dielectric insulating film using an organic silicate polymer having thermal stability, crack resistance and mechanical strength, prepared according to said process, and an electric device comprising the low dielectric insulating film for a metal wiring interlayer, prepared according to said process.

In order to achieve these objects, the present invention provides a process for preparing an organic silicate polymer comprising:

a) a polymerization step, in absence of homogenizing organic solvents, of mixing and reacting organic silane compounds with water in the presence of a catalyst to hydrolyze and condense the silane compounds. The organic silicate polymer in accordance of the present invention has a high level of unexpected network structure.

The process further can comprise:

b) an aging step of adding organic solvents to the polymerization product obtained in the step a) and heating the product to age it.

The present invention also provides a coating composition for forming a low dielectric insulating film comprising:

a) organic silicate polymers prepared by the above processes; and b) organic solvents The coating composition further can comprise:

c) an additive of one or more selected from a group consisting of an agent for improving adhesion to a substrate, a stabilizer for long-term storage, and surfactants.

The present invention further provides a process for preparing a low dielectric insulating film comprising steps of:

a) dissolving organic silicate polymers prepared by the above processes in an organic solvent and coating the resultant solution on a substrate to prepare a thin film; and b) drying the thin film, and curing the same at 300 to 500° C.

The present invention further provides an electric device comprising the low dielectric insulating film prepared according to the above process.

DETAILED DESCRIPTION AND THE PREFERRED EMBODIMENTS

Figure 1:
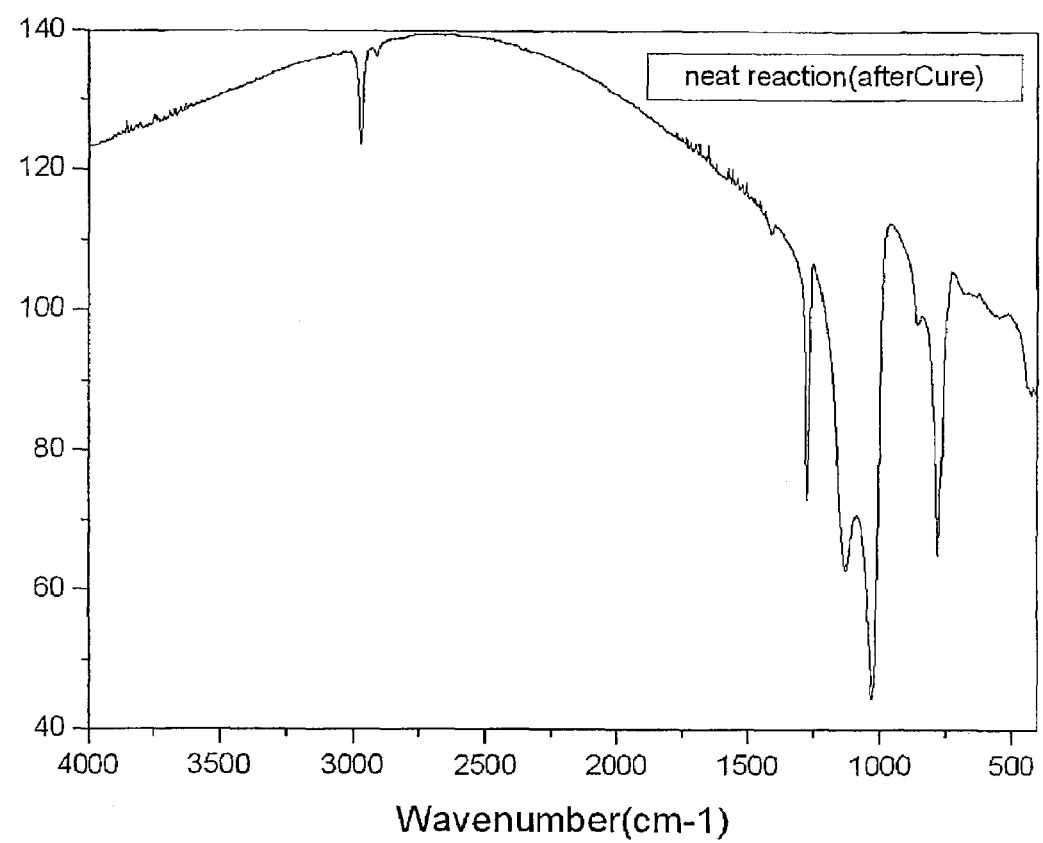
FIG. 1 is a Fourier Transform Infrared (FTIR) spectrum of the film produced by Example 2.

The present invention will now be explained in more detail.

A process for preparing an organic silicate polymer of the present invention comprises the step of direct hydrolysis and condensation reaction by mixing an organic silane compound and water in the absence of an organic solvent.

The present invention provides a process for preparing an organic silicate polymer, and a low dielectric resin composition useful as (e.g.) a resin composition capable of forming a uniform dielectric film. The mechanical strength of as-cured films formed in accordance with present invention is enhanced as compared to as-cured films formed from previously known organic silicate polymers that have high levels of a cage and/or ladder structure.

The process of the present invention for preparing the organic silicate polymer may comprise a direct hydrolysis and condensation reaction step (neat reaction), the step of mixing and reacting the organic silane compound with water to hydrolyze and condense the organic silane compound taking place in the absence of homogenizing organic solvents, and thereby growing the organic silicate polymer to a specific molecular weight. A homogenizing solvent may be added to the organic silicate polymer prepared by the neat reaction to stop the reaction, or to grow the polymer further to a desired molecular weight.

Additionally, the process of the present invention may comprise any methods comprising direct hydrolysis and condensation reactions in the absence of an organic solvent, i.e. a composition for an organic silicate polymer may be prepared by the following methods (i) to (iv).

The process of the present invention can additionally comprise:

(i) adding an organic silicate polymer and catalyst in a determined amount to an organic silane compound continuously or intermittently to hydrolyze and condense the mixture, adding the resulting mixture to in an organic solvent after a determined time after the reaction, and lowering the reaction temperature to stop the reaction and obtain an organic silicate polymer;

(ii) adding water and catalyst in a determined amount to an organic silane compound continuously or intermittently to hydrolyze and condense the mixture for a determined time, adding the resulting mixture to an organic solvent, further reacting the mixture, and lowering the reaction temperature to stop the reaction and obtain an organic silicate polymer;

(iii) adding water and catalyst in a determined amount to a silane compound continuously or intermittently to hydrolyze and condense the mixture for a determined time, further adding at least one selected from water, a silane compound, and a catalyst in a determined amount to the resulting mixture and reacting it for a determined time, and lowering the reaction temperature to obtain the organic silicate polymer; and (iv) mixing and reacting an organic silane compound with water and catalyst in a determined amount in the presence of an organic solvent to thereby hydrolyze and condense the mixture and obtain an organic silicate polymer, and mixing the organic silicate polymer with the organic silicate polymer prepared from the methods of (i) to (iii) in a determined amount.

The organic silane compound used in said process for preparing the organic silicate polymer includes, although it is not limited to, an organic silane monomer comprising silicon, carbon, oxygen and hydrogen, and organic silane oligomers that can be prepared therefrom. In addition, the silane monomer or oligomer can be used alone or in combination at a specific ratio thereof to prepare the organic silicate polymer. Preferably, a compound selected from a group consisting of a compound represented by the following Chemical Formula 1 and a compound represented by the following Chemical Formula 2 can be used alone or in combination at a specific ratio thereof to prepare the organic silicate polymer.

Chemical Formula 1

$R^1_m R^2_n SiX_{4-m-n}$ (where each of $R^1$ and $R^2$ which may be the same or different and each is a non-hydrolysable group, X is a hydrolysable group, and m and n are integers of from 0 to 3 satisfying $0 \leq m+n \leq 3$).

Formula 2

$R^3_p Y_{3-p} Si\text{-}M\text{-}SiR^4_q Z_{3-q}$ (where each of $R^3$ and $R^4$ which may be the same or different and each is a non-hydrolysable group, Y and Z which may be the same or different and each is an hydrolysable group, and p and q are integers of from 0 to 2).

In the Chemical Formula 1, each of $R^1$ and $R^2$ is independently: hydrogen; alkyl such as methyl, ethyl, propyl, butyl, or others; fluorine-containing alkyl group such as trifluoromethyl, trifluoropropyl or others; alkenyl such as vinyl, allyl, or others; or aryl such as phenyl. The alkyl groups may be linear or branched. X is independently: hydrolysable group; halogen such as chlorine; alkoxy such as methoxy; ethoxy or propoxy; acyloxy such as acetoxy; or others. Although there is no particular limitation with respect to the functional group $R^1$, $R^2$ and X, it is more preferred that $R^1$ and $R^2$ are independently hydrogen, alkyl or phenyl, and X is an alkoxy group. Some examples of Chemical Formula 1 include tetraalkoxysilane, monoalkyltrialkoxysilane, dialkyldialkoxysilane, trialkylmonoalkoxysilane, trialkoxysilane, dialkoxysilane, monoalkyldialkoxysilane, a mixture thereof, etc.

In the Chemical Formula 2, each of $R^3$ and $R^4$ is independently: hydrogen; alkyl such as methyl, ethyl, propyl, butyl, or others; fluorine-containing alkyl group such as trifluoromethyl, trifluoropropyl or others; alkenyl such as vinyl or allyl; or aryl such as phenyl. Y and Z are independently: hydrolysable group; halogen such as chlorine; alkoxy such as methoxy, ethoxy or propoxy; acyloxy such as acetoxy; or others. Although there is no particular limitation with respect to the functional group $R^3$, $R^4$, Y and Z, it is more preferred that $R^3$ and $R^4$ are independently hydrogen, alkyl or phenyl, and Y and Z are an alkoxy group. Organic bridged unit M may be alkylene or phenylene, preferably methylene, ethylene, propylene or phenylene, or a mixture thereof.

Solvents that may be used for a hydrolysis and condensation or for film coating include any agent or mixture of agents that will dissolve the composition to form a homogeneous liquid mixture of the Chemical Formula 1 and 2. The solvent used in the present invention includes aliphatic hydrocarbon solvents such as: n-pentane, isopentane, n-hexane, isohexane, cyclohexane and the like; aromatic hydrocarbon solvents such as benzene, toluene, xylene, alkyl benzene, naphthalene and the like; alcohol solvents such as methanol, ethanol, n-propanol, isopropanol, n-butanol, t-butanol, cyclohexanol, methylcyclohexanol and the like; ether solvents such as tetrahydrofuran, 2-dimethyl dioxane, ethylene glycol monomethyl ether, ethylene glycol monoethyl ether, ethylene glycol dimethyl ether, ethylene glycol diethyl ether, propylene glycol monomethyl ether, propylene glycol monomethyl ether, propylene glycol monoethyl ether and the like; ester solvents such as ethyl formate, methyl acetate, ethyl lactate, diethyl carbonate, ethylene carbonate, ethylene glycol monomethyl ether acetate, propylene glycol monoethyl ether acetate, ethylene glycol diacetate and the like; and amide solvents such as N-methyl pyrrolidone, formamide, N-methyl formamide, N,N-dimethyl formamide, N-ethyl formamide, N,N-diethyl formamide, N-methyl acetamide, N-ethyl acetamide and the like.

Solvents that have been used in hydrolysis and condensation are completely removed after the reactions to obtain organic silicate polymer as an oil or a powder, which can be dissolved in a film-forming solvent and used, or the organic solvent that has been used in hydrolysis and condensation can be directly used for film-forming.

As the catalyst, an acid or a base may be used for the hydrolysis and condensation of silane compounds. However it is more preferable to use an acid for the direct hydrolysis and condensation reaction (neat reaction) to control reaction rate, while both acid and base catalysts may be used for the hydrolysis and condensation of silane in the presence of solvent. Examples of the catalysts used in the present invention include: inorganic acids such as hydrochloric acid, hydrofluoric acid, nitric acid, sulfuric acid, phosphoric acid and the like; organic acids such as formic acid, acetic acid, propionic acid, butanoic acid, pentanoic acid, oxalic acid, maleic acid, malonic acid, butyric acid, sulfonic acid, phthalic acid, furamic acid, citric acid, tartaric acid and the like; inorganic bases such as ammonia, sodium hydroxide, potassium hydroxide, calcium hydroxide and the like; and organic bases such as pyridine, piperazine, piperidine, choline, dimethylamine, diethylamine, triethylamine, monoethanolamine, diethanolamine, triethanolamine, monomethyldiethanolamine, dimethylmonoethanolamine and the like. Other catalysts such as metal chelate compounds and salt catalysts may also be used in this invention. The amount of catalyst used in general is 0.001 to 1 mole, preferably 0.5 moles or less, per mole of the sum of the silane compounds of the Chemical Formulae 1 and 2.

There are no particular limitations on the reaction temperature when the product is made to have a desired molecular weight. The temperature may preferably be not higher than the boiling point of the organic solvent used, and may preferably be 0° C. to 100° C. in order to control the molecular weight of the resultant hydrolyzed product. There are no particular limitations on the reaction time at the time of hydrolysis and condensation, and the reaction may be completed at the time the product reaches a stated molecular weight. It is usually preferred to set the molecular weight of the final product within a range of from 500 to 1,000,000 as a weight-average molecular weight. If the molecular weight of a hydrolyzed condensate of the Chemical Formula 1 or a mixture of Chemical Formula 1 and 2 is less than 500, it may be difficult to form a uniform coating film, and if the molecular weight of a hydrolyzed condensate is greater than 1,000,000, the condensate polymer may become insoluble.

Furthermore, the aging-step, which is conducted by adding organic solvents to the organic silicate polymer and heating to age it, is preferably conducted at a temperature of 15 to 100° C.

The present invention's coating composition for forming an insulating film is prepared by dissolving the organic silicate polymers made by the above processes with organic solvents. If desired, various additives, such as an agent for improving the adhesion to a substrate, a stabilizer for long-term storage, and a surfactant for uniform film coating, may be added to the composition of the present invention before forming a coating film in such an amount as will not impair the effects of the present invention.

As a method for forming a coating film on a substrate, it is preferred to employ a method wherein the composition of the present invention containing a solvent is coated on the substrate, followed by heating and drying to evaporate the solvent. Here the resin composition is applied to a substrate by methods known in the art such as spin coating, dip coating, spray coating, flow coating, screen printing or others. The coating method may suitably be selected depending on the shape of the substrate to be coated, the required film thickness, etc. When the composition of the present invention is to be applied to an interlayer dielectric film for a semiconductor device, a spin coating method is preferred, since the in-plane distribution of the film thickness will thereby be uniform. The solid content concentration in the solution, as the sum of the resin composition of Chemical Formula 1 and Chemical Formula 2 may suitably be selected from the viewpoint of the desired viscosity of the solution or the thickness of the coating film, within the range whereby the solid content dissolves.

To form a coating film, a curing step is required after coating to evaporate the solvent and to further crosslink the partially hydrolyzed co-condensate of mixture of the resin Formulae 1 and 2. The heating may be conducted as a single-step process or a step-wise process. For a sufficient cure the partially hydrolyzed co-condensate of the mixture of resin Chemical Formulae 1 and 2 and to ensure that unreacted alkoxysilyl groups or silanol groups will not remain, a final curing at a temperature of preferably from 300 to 500° C., more preferably from 400 to 500° C., is required. Unreacted alkoxysilyl groups or silanol groups will be a factor for increasing the dielectric constant of the coating film by themselves, and they may further be a water absorbing site, which causes an increase of the dielectric constant by water. Accordingly, it is desirable not to let them remain in the coating film.

The coating produced by the method herein are used on any substrate such as a metal or a ceramic but it is particularly useful on an electronic substrate intended for use in manufacture of an electronic device, examples of which include: an integrated circuit (IC) device such as a memory IC, logic IC or MMIC (monolithic microwave IC); a hybrid IC; an optical device such as a light emitting diode or a charge-coupled device; a display device such as a liquid crystal display device and the like.

The coating film formed by the present invention is applied as a buffer coating film, a passivation film, or an interlayer dielectric film for an electronic device, whereby it is possible to attain high performance in (e.g.) reducing the time of signal propagation delay of a device by virtue of excellent electrical properties such as a low dielectric constant and a high dielectric strength, and it is also possible to attain high reliability by virtue of excellent mechanical properties.

The organic silicate polymer prepared by the present invention may be useful as a matrix resin composition for preparing porous dielectric films. For instance a mixture of the organic silicate polymer prepared by the present invention and thermally labile polymers or organic small molecules may be spin-coated and thermally cured to initiate vitrification and decomposition of labile polymers or small molecules.

Now, the following examples are provided to illustrate the present invention. The detailed preparations fall within the scope of, and serve to exemplify, the more generally described methods set forth above. These examples are presented for illustrative purposes only, and should not used to limit the scope of this invention found in the claims.

EXAMPLE 1

0.67 ml of distilled water and 0.80 ml of 2 N hydrochloric acid were mixed, and then 7.6 ml of methyltrimethoxy silane were added to the mixture. The resultant was put into a reactor, maintained at a temperature of 5° C., and reacted for 2 hours. The temperature was then elevated to room temperature and it was further reacted for 2 hours. The reactant solution was then diluted with toluene solvent and washed with water three or four times until it became neutral. Magnesium sulfate was introduced into the obtained organic layer to completely remove remaining water therein, and the solvent was completely removed from the obtained organic layer in a vacuum oven to obtain a solid phase product.

(Preparation of Insulating Film)

300 mg of the obtained powder was dissolved in methylisobutyl ketone such that the total solution amounted to 1.5 g. The obtained solution was filtered to remove impurities therefrom, and then it was spin coated to obtain thin film, and it was dried and cured under a nitrogen atmosphere to prepare an insulating film.

EXAMPLE 2

3.5 ml of distilled water and 0.60 ml of 5 N hydrochloric acid were mixed, and then 12.82 ml of methyltrimethoxy silane and 1.37 ml of dimethoxydimethyl silane were slowly added to the mixture under a nitrogen atmosphere. The resultant was put into a reactor, maintained at approximately 5° C., and reacted for 2 hours, and then the temperature was elevated to room temperature and the reaction was further continued for 2 hours. 15 ml of tetrahydrofuran (THF) solvent was added to the mixture, and then the temperature was slowly elevated and reaction was further continued for 4 hours while heat-refluxing. The reactant was diluted with ether solvent and washed with water three or four times until it became neutral. Magnesium sulfate was introduced into the obtained organic layer to completely remove remaining water therein, and the solvent was completely removed from the obtained organic layer in a vacuum to obtain a solid phase product.

(Preparation of Insulating Film)

The obtained powder was dried and cured by the same method as in Example 1 to prepare an insulating film.

EXAMPLE 3

1.2 ml of distilled water and 0.7 ml of 2 N hydrochloric acid were mixed, and then 6 ml of methyltrimethoxy silane and 1.06 ml of bistrimethoxysilylethane were slowly added to the mixture under a nitrogen atmosphere. The resultant was put into a reactor, maintained at approximately 5° C., and reacted for 2 hours, and then the temperature was elevated to room temperature and the reaction was further continued for 2 hours. 15 ml of tetrahydrofuran (THF) solvent was added to the mixture, and then the temperature was slowly elevated and reaction was further continued for 4 hours while heat-refluxing. The reactant was diluted with ether solvent and washed with water three or four times until it became neutral. Magnesium sulfate was introduced into the obtained organic layer to completely remove remaining water therein, and the solvent was completely removed from the obtained organic layer in a vacuum to obtain a solid phase product.

(Preparation of Insulating Film)

The obtained powder was dried and cured by the same method as in Example 1 to prepare an insulating film.

EXAMPLE 4

4.05 ml of distilled water and 0.80 ml of 2 N hydrochloric acid were mixed, and then 7.6 ml of methyltrimethoxy silane were slowly added to the mixture under a nitrogen atmosphere. The resultant was put into a reactor, maintained at 5° C., and reacted for 2 hours. 10 ml of tetrahydrofuran (THF) was added to the mixture, and then the temperature was slowly elevated and reaction was further continued for 4 hours while heat-refluxing. The reactant was then diluted with toluene solvent and washed with water three or four times until it became neutral. Magnesium sulfate was introduced into the obtained organic layer to remove remaining water therein, and the solvent was completely removed from the obtained organic layer in a vacuum oven to obtain a solid phase product.

(Preparation of Insulating Film)

The obtained powder was dried and cured by the same method as in Example 1 to prepare an insulating film.

COMPARATIVE EXAMPLE 1

7.6 ml of methyltrimethoxy silane and 0.67 ml of distilled water and 10 ml of tetrahydrofuran (THF) solvent were mixed, and then 0.80 ml of 2 N hydrochloric acid was slowly added to the mixture under a nitrogen atmosphere. They were reacted at room temperature for 30 minutes, and then the temperature was slowly elevated and reaction was further continued overnight while heat-refluxing. After reaction, the temperature of the solution was again lowered to room temperature, and then the solution was diluted with toluene solvent and washed with water three or four times until it became neutral. Magnesium sulfate was introduced into the obtained organic layer to completely remove remaining water therein, and the solvent was completely removed from the obtained organic layer in a vacuum oven to obtain a solid phase product.

(Preparation of Insulating Film)

The obtained powder was dried and cured by the same method as in Example 1 to prepare an insulating film.

COMPARATIVE EXAMPLE 2

12.8 ml of methyltrimethoxy silane, 1.37 ml of dimethoxydimethyl silane, 3.5 ml of distilled water and 20 ml of tetrahydrofuran (THF) solvent were mixed, and then 0.6 ml of 5 N hydrochloric acid was slowly added to the mixture under a nitrogen atmosphere. They were reacted at room temperature for 30 minutes, and then the temperature was slowly elevated and reaction was continued overnight while heat-refluxing. After reaction, the temperature of the solution was lowered again to room temperature, and then the solution was diluted with toluene solvent and washed with water three or four times until it became neutral. Magnesium sulfate was introduced into the obtained organic layer to completely remove remaining water therein, and the solvent was completely removed from the obtained organic layer in a vacuum oven to obtain a solid phase product.

(Preparation of Insulating Film)

The obtained powder was dried and cured by the same method as in Example 1 to prepare an insulating film.

COMPARATIVE EXAMPLE 3

6 ml of methyltrimethoxy silane, 1.06 ml of the bistrimethoxysilylethane and 15 ml of tetrahydrofuran (THF) were mixed and then 0.7 ml of 2N hydrochloric acid with 1.2 ml of distilled water was slowly added to the mixture under a nitrogen atmosphere. They were reacted at room temperature for 30 minutes, and then the temperature was slowly elevated and reaction was further continued overnight while heat-refluxing. After reaction, the temperature of the solution was lowered again to room temperature, and then the solution was diluted with ether solvent and washed with water three or four times until it became neutral. Magnesium sulfate was introduced into the obtained organic layer to completely remove remaining water therein, and the solvent was completely removed from the obtained organic layer in a vacuum oven to obtain a solid phase product.

(Preparation of Insulating Film)

The obtained powder was dried and cured by the same method as in Example 1 to prepare an insulating film.

COMPARATIVE EXAMPLE 4

7.6 ml of methyltrimethoxy silane, 4.05 ml of distilled water and 10 ml of tetrahydrofuran (THF) were mixed, and then 0.80 ml of 2 N hydrochloric acid was slowly added to the mixture. They were reacted at room temperature for 30 minutes, and then the temperature was slowly elevated and reaction was continued overnight while heat-refluxing. After reaction, the temperature of the solution was lowered again to room temperature, and then the solution was diluted with toluene solvent and washed with water three or four times until it became neutral. Magnesium sulfate was introduced into the obtained organic layer to completely remove remaining water therein, and the solvent was completely removed from the obtained organic layer in a vacuum oven to obtain a solid phase product.

(Preparation of Insulating Film)

The obtained powder was dried and cured by the same method as in Example 1 to prepare an insulating film.

(Formation of Thin Film and Evaluation of Properties Thereof)

Organic silicate polymers prepared in the Examples 1-4 and Comparative Examples 1-4 were manufactured into thin films and the properties thereof were evaluated and are represented in Table 1.

Molecular weights (weight average molecular weight: Mw) were obtained as relative molecular weight values using gel permeation chromatography (GPC) with polystyrene as a standard. The mechanical properties of thin films were measured by spin coating the polymers on 2×2 inch Si wafers and curing them at 420° C. for 1 hour under $N_2$ conditions. Hardness and modulus were measured using a TriboIndenter from Hysitron Inc. Crack resistance was measured by observing whether or not cracks were generated when thin films of 1 μm thickness were prepared under the same conditions as the above.

TABLE 1

| | Example 1 | Example 2 | Example 3 | Example 4 | Comparative Example 1 | Comparative Example 2 | Comparative Example 3 | Comparative Example 4 |
|---|---|---|---|---|---|---|---|---|
| Mw | 18300 | 6500 | 9000 | 9100 | 8500 | 4200 | 26000 | 11000 |
| Modulus | 4.89 | 3.41 | 5.52 | 3.95 | 1.95 | 2.03 | 3.99 | 2.31 |
| Hardness | 0.76 | 0.48 | 0.87 | 0.64 | 0.25 | 0.17 | 0.62 | 0.32 |
| Crack Resistance (1 μm) | No crack | No crack | No crack | No crack | Crack formed | Crack formed | No crack | Crack formed |

The above Table 1 shows the insulating film prepared using the organic silicate polymer prepared according to the present invention has enhanced mechanical strength.

Figure 2:
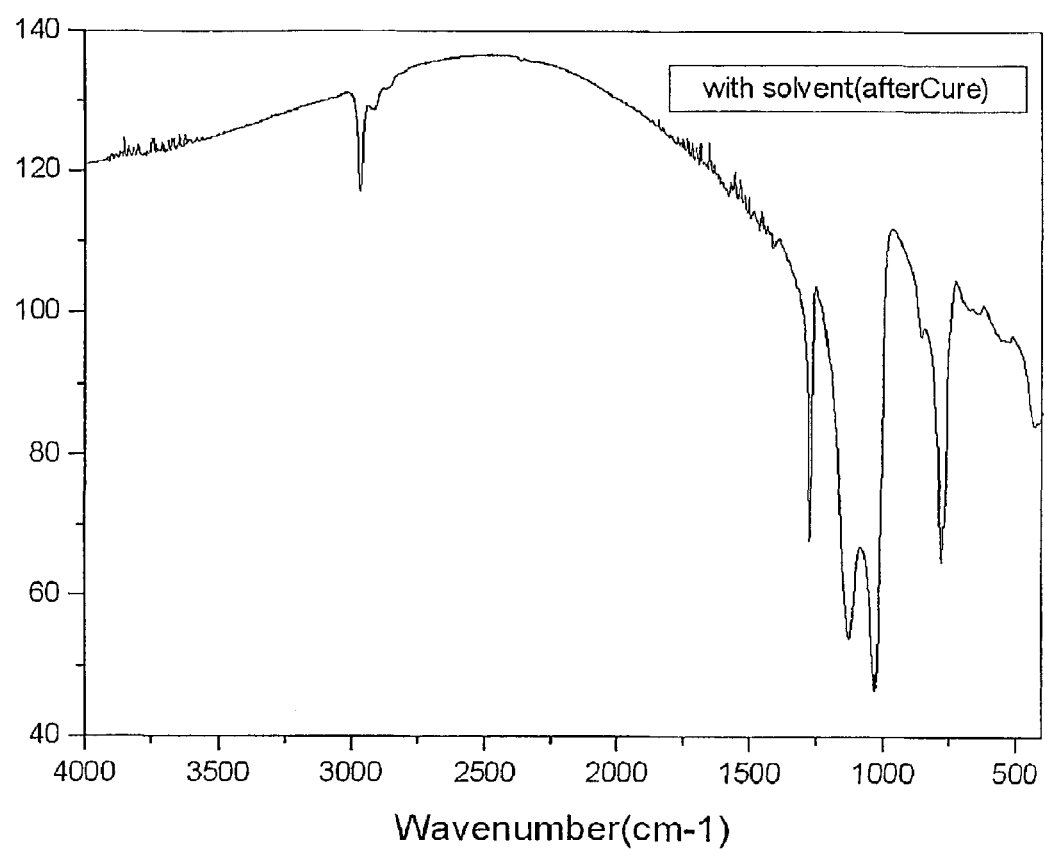
FIG. 2 is a Fourier Transform Infrared (FTIR) spectrum of the film produced by Comparative Example 2.

FIGS. 1 and 2 shows two peaks in the range of 1000 $cm^{-1}$~1200 $cm^{-}$, corresponding to absorbance at a siloxane (Si—O—Si) "stretch". FIG. 1 shows a FTIR of a film produced by Example 2 with a much stronger absorbance at about 1030 cm$^{-1}$, confirming that the film prepared by Example 2 contains a higher level of long chain network Si—O—Si structures than the film produced by Comparative Example 2. Similar results have been observed in other examples.

The insulating film prepared using the organic silicate polymer prepared according to the present invention, therefore, has excellent mechanical strength and crack resistance.

What is claimed:

1. A process for preparing an organic silicate polymer comprising:
   a) a polymerization step, in absence of homogenizing organic solvents, of mixing and reacting organic silane compounds with water in the presence of a catalyst to hydrolyze and condense the silane compounds at a temperature of 0° C. to 100° C. to obtain an organic silicate polymer having a network structure,
   wherein the organic silane compound is one or more selected from a group consisting of a compound represented by Chemical Formula 1, a compound represented by Chemical Formula 2, organic silane oligomers thereof, and a mixture thereof,

   $R^1_m R^2_n SiX_{4-m-n}$     Chemical Formula 1 where each of $R^1$ and $R^2$ which may be the same or different is hydrogen, alkyl group, fluorine-containing alkyl group, alkenyl, or aryl, X is a hydrolysable group, halogen, alkoxy, or acyloxy, and m and n are integers of from 0 to 3 satisfying 0≦m+n≦3, and

   $R^3_p Y_{3-p} Si\text{-}M\text{-}SiR^4_q Z_{3-q}$     Chemical Formula 2 where each of $R^3$ and $R^4$ which may be the same or different is hydrogen, alkyl group, fluorine-containing alkyl group, alkenyl, or aryl, Y and Z, which may be the same or different, is a hydrolysable group, halogen, alkoxy, or acyloxy, M is an organic bridged unit including methylene, ethylene, propylene, or phenylene, and p and q are integers of from 0 to 2;
   b) an aging step of adding organic solvents to the polymerization product obtained in the step a) and heating the product at a temperature of 15° C. to 100° C., and
   c) a drying step of removing the organic solvents and the water from the aged polymerization product to obtain a solid phase organic silicate polymer.

2. The process for preparing the organic silicate polymer according to claim 1, wherein an amount of the catalyst of step a) is 0.001 to 1 mole per mole of the organic silane compounds.

3. The process for preparing the organic silicate polymer according to claim 1, wherein the catalyst of step a) is an acid catalyst.

4. The process for preparing the organic silicate polymer according to claim 1, wherein the organic silane compound represented by Chemical Formula 1 is a monoalkyltrialkoxysilane, dialkyldialkoxysilane, trialkylmonoalkoxysilane, trialkoxysilane, dialkoxysilane, monoalkyldialloxysilane.

5. The process for preparing the organic silicate polymer according to claim 1, wherein the organic silane compound of step a) is a mixture of the compound represented by Chemical Formula 1 and the compound represented by Chemical Formula 2.

6. The process for preparing the organic silicate polymer according to claim 5, wherein the compound represented by Chemical Formula 1 is methyltrimethoxysilane and the compound represented by Chemical Formula 2 is bis-trimethoxysilylethane.

* * * * *